April 28, 1970 R. W. YORK 3,508,598
PROCESS FOR MAKING AND ASSEMBLING SHELL MOLDS
Filed Feb. 27, 1968 3 Sheets-Sheet 1

ROY W. YORK
INVENTOR.

BY John K Faulkner
Glenn A Arendsen
ATTORNEYS

ROY W. YORK
INVENTOR.

BY John R. Faulkner
Glenn S. Arendsen
ATTORNEYS

ROY W. YORK
INVENTOR.

BY John R Faulkner
Glenn S Arendsen

ATTORNEYS

United States Patent Office 3,508,598
Patented Apr. 28, 1970

3,508,598
PROCESS FOR MAKING AND ASSEMBLING SHELL MOLDS
Roy W. York, Grosse Pointe Park, Mich., assignor to Ford Motor Company, Dearborn, Mich., a corporation of Delaware
Filed Feb. 27, 1968, Ser. No. 708,646
Int. Cl. B22c *13/08, 25/00*
U.S. Cl. 164—1
12 Claims

ABSTRACT OF THE DISCLOSURE

The first shell half from a rotary pattern is stored in a vertical stacking unit and then pushed onto one horizontal platen of a booking fixture as its sister shell half is pushed onto the other platen from a conveyor station. The booking fixture is mounted on a rotary table and as the table indexes the platens swing upward to an angle other than vertical to move the faces of the shell halves into contact with each other. When the shell halves come together, the weight of one half is transferred from its initial platen to the other platen. The platens then swing back to a horizontal position and the completed shell mold is removed from the booking fixture.

SUMMARY OF THE INVENTION

Shell molds are used widely for casting engine crankshafts, camshafts, and rocker arms rapidly and efficiently. Each mold is made from shell portions formed by contacting molding material such as a sand and binder mixture with a heated pattern. Molding material in contact with and in the immediate vicinity of the pattern is partially cured into a thin walled structure having part of the cavity for making the desired casting formed on its interior and roughly conforming to the shape of the cavity on its exterior. After completely curing the shell portion it is lifted off the pattern and assembled into a mold by attaching the various portions together. The mold then is placed in a flask and the space surrounding the mold is filled with metal shot or other backing material to provide sufficient strength for the mold during the casting operation.

It has been conventional practice to manually lift the shell portions off the pattern and assemble the shell portions by manually positioning one portion onto the other. Larger shell portions such as those used to cast crankshafts are difficult for workmen to handle and assemble accurately, however, and frequently portions of the mold pattern are abraded or broken during the positioning operation. Since it is impossible to see the mold pattern after the shell portions are assembled, the mold subsequently is poured and a defective part results. Smaller shell portions such as those used in molding rocker arms are easier for workmen to handle but present indexing difficulties nevertheless, and the manual indexing operation frequently results in a defective part.

This invention provides an automated process for assembling shell molds that eliminates the need for manually handling the individual mold portions. The process comprises locating one of the portions making up the shell mold on one platen of a booking fixture, locating another portion on the opposite platen, and swinging the platens toward each other to bring the faces of the portions into contact. Face contact preferably takes place when the platens are at an angle other than vertical so the weight of one shell portion is transferred from its initial platen to the other platen. The platens then swing away from each other and the completed shell mold is removed from the booking fixture.

Aligning pads are fastened to the platens to position the shell portions for proper face alignment. The levers supporting and swinging the platens are designed so no lateral forces occur at the faces of the shell portions when the faces contact each other, thereby preventing abrasion or breakage at the shell faces. Shell portions having projecting elements on the exterior surfaces such as the portions disclosed in U.S. patent application Ernest et al. Ser. No. 633,962, filed Apr. 26, 1967 and assigned to the assignee of this application are preferably used in this process as such shell portions eliminate many stability problems and simplify alignment. The entire disclosure of the Ernest et al. application is incorporated herein by this reference.

An adhesive can be applied to the faces of the shell portions either before or after the portions are loaded onto the platens and the platens can be mounted on a rotating table designed so the faces of the mold portions are held in contact long enough to permit curing the adhesive. While the platens are swinging the shell portions toward contact with each other, a blast of air can be directed at the mold cavities to remove any loose foreign particles.

DETAILED DESCRIPTION

Figure 1:
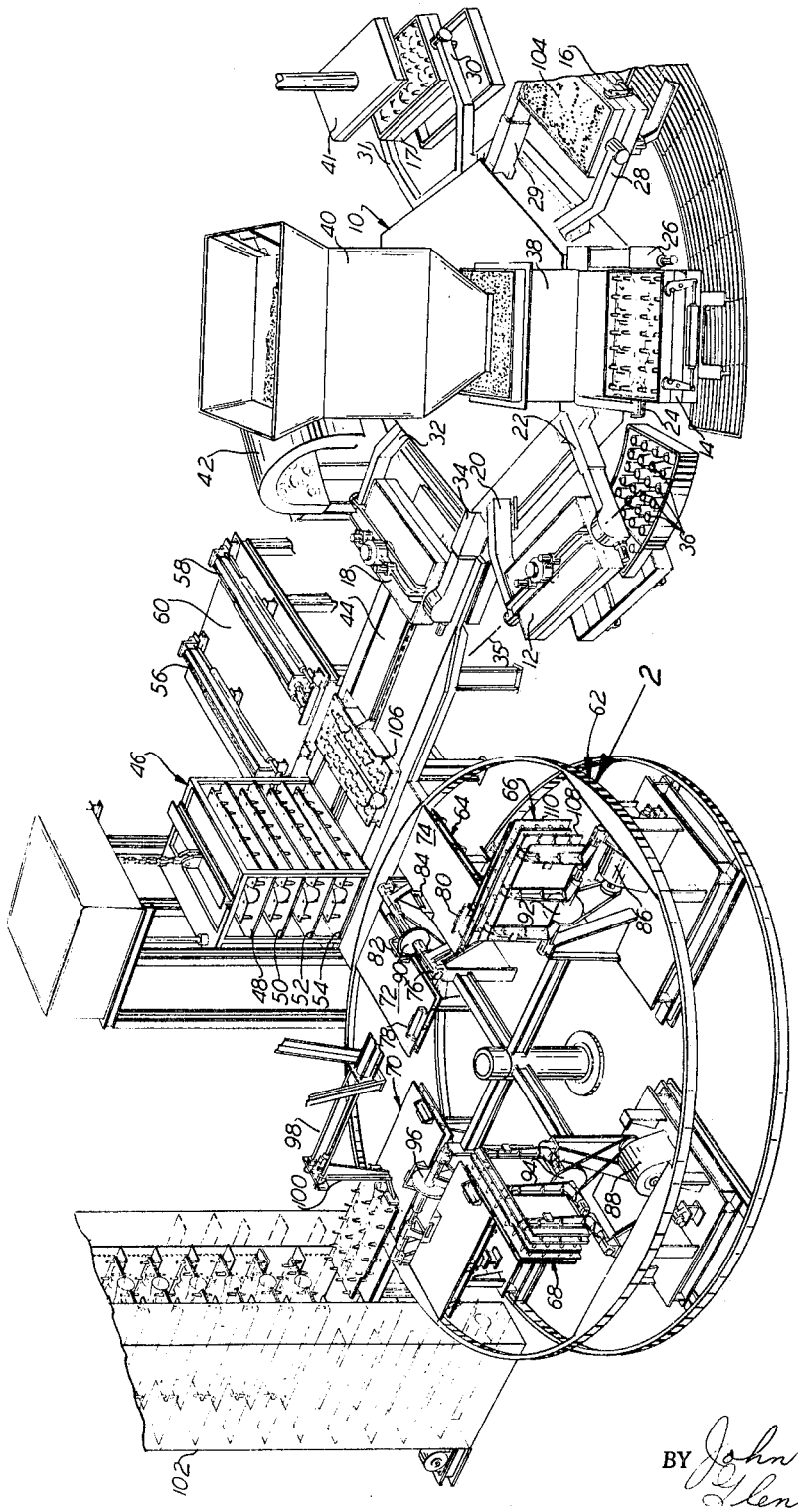
FIGURE 1 is a perspective view of apparatus useful in making shell molds for casting engine crankshafts according to this invention showing the shell forming and curing equipment, storage equipment for coordinating shell halves from the same pattern, a rotating table carrying the booking fixture, and a conveying system for transporting the shell molds to subsequent processing stations.

A rotating pattern carrier indicated by the numeral 10 has six patterns mounted at its exterior periphery, five of which are designated in FIGURE 1 by numerals 12, 14, 16, 17 and 18. Carrier 10 rotates in a counterclockwise direction. The patterns are designed to produce an entire shell half and are intended to be identical; manufacturing the patterns, however, is not an exact procedure and minor variations usually exist. Thus, shell halves formed on the same pattern preferably are mated into a complete shell mold. An additional reason for assemblying shell halves from the same mold is that molds for different components can then be produced on the same pattern carrier, a technique that increases the manufacturing versatility of the equipment.

Each pattern is supported between outwardly extending arms 20 and 22, 24 and 26, 28 and 29, 30 and 31, and 32 and 34, respectively, and can be pivoted about a horizontal axis passing through the end portions of the arms, i.e., axis 35 of pattern 12. A plurality of natural gas burners 36 are positioned below and just ahead of the location of pattern 12 in the drawing. A dispensing hopper 38 is suspended above the location of pattern 14, and a larger storage hopper 40 is suspended above hopper 38. A spanking fixture 41 is located above the position of pattern 17 and is connected to a hydraulic ram mechanism (not shown) capable of moving the spanking fixture into contact with the projecting elements formed on the shell exterior in accordance with the teachings of the aforementioned U.S. patent application Ser. No. 633,962.

A curing oven 42, the exit end of which is shown, extends about one-fourth of the distance around carrier 10 and is positioned so the patterns are rotated through the oven. Below the position of pattern 18 is a conveyor belt 44. Belt 44 extends radially outward from carrier 10 and terminates adjacent a vertical stacking unit 46. Stacking unit 46 has six vertically spaced storage trays, four of which are designated by numerals 48, 50, 52 and 54 (the remaining two trays are hidden from view by other equipment). Two coordinated pneumatic rams 56 and 58 are mounted on a table 60 at the right side of stacking unit 46 and belt 44. Ram 56 is aligned with the stacking unit and ram 58 is aligned with an adjacent position of conveyor belt 44.

A rotary table 62 having four stations is located across belt 44 from rams 56 and 58. Table 62 rotates clockwise and contains four booking fixtures designated by numerals 64, 66, 68 and 70. Taking booking fixture 64 as an example, each fixture comprises two platens 72 and 74 mounted for swinging movement on either side of a horizontal shaft 76. An aligning pad 78, 80 is located at the inner end of each platen and a second aligning pad 82, 84 is located at the platen edges adjacent shaft 76.

Below each booking fixture is a low speed electric motor such as the motors designated by numerals 86 and 88 below fixtures 66 and 68, respectively. The motors are mounted on a platform and rotate along with the respective booking fixture. A power transmission belt connects the pulley of each motor with a pulley 90, 92, 94, 96 mounted on the horizontal shaft supporting the platens of the booking fixture. Each supporting shaft comprises an inner and an outer sleeve, with one platen connected to the inner sleeve and the other connected to the outer sleeve. Appropriate gearing well known in the art between the pulley on the shaft and the inner and outer sleeves turns the sleeves in opposite directions when the pulley is turned.

A pneumatic ram assembly 98 is suspended above the clockwise platen of booking fixture 70. Ram assembly 98 has a depending arm 100 designed to contact an assembled shell mold resting on the platen and slide that shell mold from the platen onto a tray of an adjacent conveyor 102.

OPERATION

As each of the patterns passes through the position shown for pattern 12, the heat produced by burners 36 raises the temperature of the pattern face to approximately 500° F. A device (not shown) for automatically controlling the temperature of the pattern face can be included if desired, and heat shields (not shown) can be attached to the leading and trailing edges of the pattern to make the temperature distribution across the pattern face more uniform. Upon reaching the position shown for pattern 14 the pattern pivots about its axis 35 so it faces upward. Dispensing hopper 38 then applies a metered amount of molding sand onto the heated pattern. Carrier 10 rotates the pattern into the position shown for pattern 16 where the molding sand is represented by numeral 104.

After a brief investment period during which the molding sand in contact with and in the immediate vicinity of the heated pattern face is partially cured, the pattern is pivoted again about its axis 35 to dump the excess molding sand into a receiver (not shown). This excess sand is screened and transported back to hopper 40 for reuse by a conveying means (not shown). A partially cured shell half remains in contact with the pattern, and the pattern again pivots about its axis 35 to position the partially cured shell half on the top thereof upon reaching the location of pattern 17.

Spanking fixture 41 then moves downward to level the ends of the projecting elements on the shell exterior. The ends of the projecting elements are relatively soft at this point and fixture 41 exerts only a very small force thereon. The face of spanking fixture 41 generally is a flat member that renders the ends of the projecting elements substantially coplanar. The plane of the ends can parallel or intersect the plane of the shell mold face as desired. In some cases a contour on the ends of the projecting elements might be useful and such a contour can be produced by correspondingly contouring the face of the spanking fixture. As fixture 41 retracts, the pattern and its shell half enter oven 42.

While passing through oven 42 the shell half is completely cured into a substantially rigid structure. When the pattern reaches the position shown for pattern 18, it again pivots about its axis 35 so the shell half is on the lower side of the pattern. Appropriate ejecting means such as the conventional stripping pins (not shown) dislodge the shell half from the pattern and the shell half drops onto conveyor belt 44. As belt 44 moves the shell half toward stacking unit 46, the pattern carrier again rotates the pattern to the position shown for pattern 12 and repeats the cycle.

The controls for stacking unit 46 are actuated by carrier 10 so the stacking unit automatically indexes each time the carrier produces or should have produced a shell half; thus one of the stacking unit trays always receives the earlier of any two shell halves from one of the patterns on carrier 10. When the six trays have been indexed, the stacking unit returns to the lower position where the shell half on tray 48 is aligned with ram 56. When the sister shell half produced on the same pattern reaches the position shown for shell half 106, a sensing system actuates rams 56 and 58 to push both shell halves onto platens 72 and 74 respectively. The stacking unit then indexes to await the sister shell half from the same pattern as the shell half located on tray 50.

Each shell half can be visually inspected for defects in the mold cavity and shell face as the shell half is conveyed along belt 44. Any defective shell halves are removed from the conveyor prior to reaching the position of shell half 106, and with stacking unit indexing nevertheless, removal of a defective shell half results in an empty tray in the stacking unit. The stacking unit continues to function as described above for the other shell halves and the next acceptable shell half from the same pattern as the defective one moves onto the tray that was empty during the previous cycle. Rams 56 and 58 are actuated only when shell halves appear on both the tray aligned with ram 56 and the position of shell half 106, so if the second shell half of a set is removed because of defects, the stacking unit indexes without moving the acceptable shell half onto the booking fixture platens. Thus, without disrupting production, the stacking unit automatically insures that sister shell halves are formed into completed shell molds even though defective shell halves are deleted from the system.

Table 62 can be rotated continuously, in which case empty booking fixtures might be rotated, or can be controlled to rotate only when shell halves are placed on platens 72 and 74. When table 62 indexes the booking fixture carrying shell halves into the position of fixture 66, motor 86 is actuated to swing the platens upward toward each other and thereby brings the faces of the shell halves into contact.

Figures 2, 3:
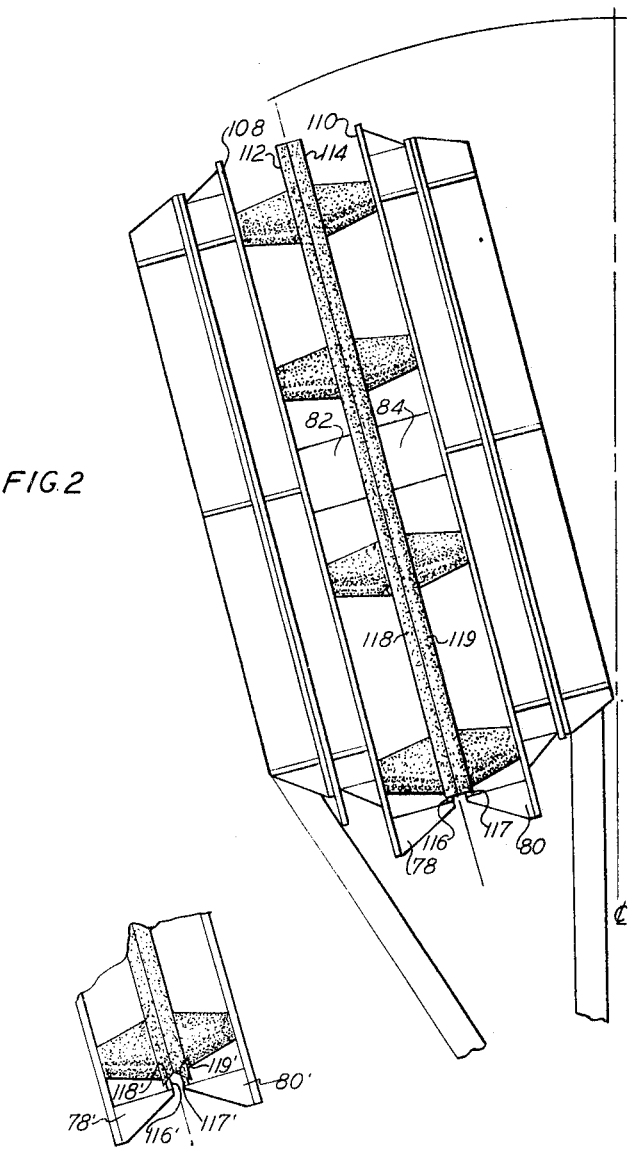
FIGURE 2 is a view taken in the direction of arrow 2 showing a typical angle at which the faces of the shell halves contact each other.
FIGURE 3 shows an alternate construction of the shell halves and aligning pads in which the edge of the face of each shell half is angled outward from the plane of the shell face. With a corresponding angle on the aligning pad, the pad tends to hold the shell half on the platen throughout the entire swinging motion.

Referring to FIGURE 2, the clockwise platen, represented by numeral 108, swings less than 90° while the counterclockwise platen 110 swings more than 90° before the faces of the shell halves 112 and 114 contact each other. When the shell faces contact each other, the weight of shell half 114 transfers from platen 110 via shell half 112 to platen 108. Making face contact at an angle about 15° from the vertical has been satisfactory for large crankshaft molds, but this angle can vary widely depending on the geometry and weight distribution of the shell halves and should be determined empirically. Shell portion 112 is held in position on platen 108 during the swinging movement by virtue of the aligning pads 78 and 82, while platen 110 swings rapidly enough for the centrifugal force to hold shell portion 114 in contact with aligning pads 80 and 84. The aligning pads can be designed as shown in FIGURE 2 with a small bumper 116, 117 contacting the face edges 118, 119 of the shell halves. These face edges serve as an accurate reference point and therefore can be used in aligning the faces of the shell halves without physically contacting the faces themselves.

Improved operation results from forming an outward angle on the face edges 118′, 119′ and forming corresponding bumpers 116′, 117′ with corresponding angles as shown in FIGURE 3. In addition to easing removal of the shell half from the pattern on carrier 10, this construction assists in retaining the shell halves on the platens during the booking operation and permits the use of slowing swinging speeds. The angle preferably does not exceed about 10° from the perpendicular to the plane of the shell face.

Table 62 then rotates the booking fixture through the position shown for fixture 68 in FIGURE 1 and toward the position shown for fixture 70. Motor 88 is actuated to return the platens to a substantially horizontal position and, because of the overcenter relationship of the counterclockwise platen when the shell halves contact each other, the assembled shell mold remains on the clockwise platen. As the fixture rotates into the position shown for booking fixture 70, ram assembly 98 is actuated to push the completed shell mold off of the clockwise platen into the conveyor 102.

Figure 4:
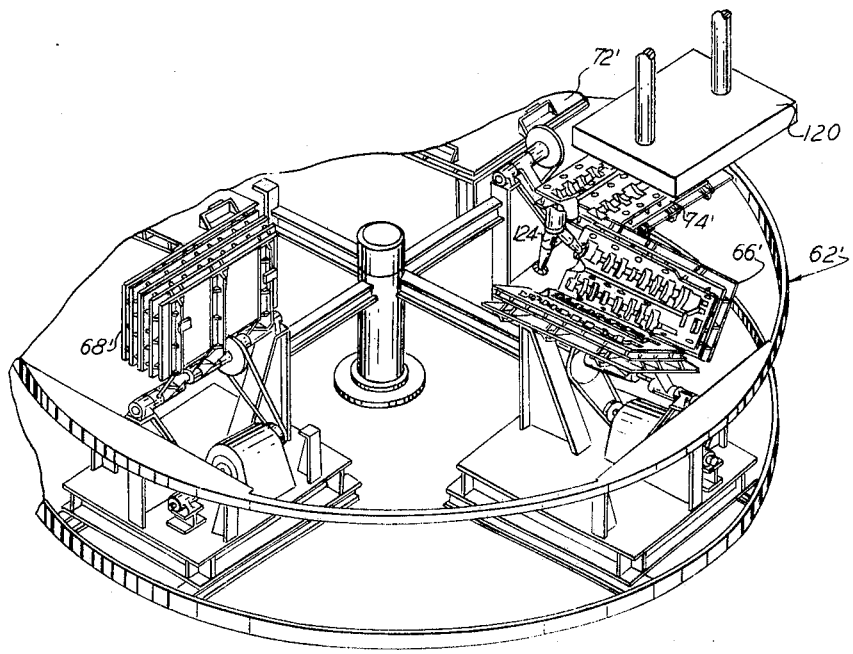
FIGURE 4 shows a modified rotating table that holds the shell halves in an intermediate position with the halves at an angle to the horizontal while pressurized air removes any loose particles from the mold cavities. A dispensing device for automatically applying adhesive to the shell faces as the shell halves are loaded onto the platens also is shown in FIGURE 4.

Metal clips can be manually inserted on the assembled shell molds at any time between positions 66 and 70 to hold the shell mold together during subsequent processing. A more efficient process utilizes an adhesive to hold the shell halves together. FIGURE 4 shows a modified version of table 62 designated therein as table 62′ in which an adhesive is automatically applied to the shell halves after the halves are pushed onto the platens. Referring to FIGURE 4, an adhesive dispenser 120 is positioned above platen 74′. Adhesive is dispensed onto the face of the shell half on platen 74′ immediately after the shell half is positioned on the platen. Table 62′ is then designed with a holding time between the positions of booking fixtures 66 and 70 sufficient to at least partially cure the adhesive. With conventional adhesives, a holding time of about 40 seconds under a clamping force sufficient to produce a pressure of about 3.5 pounds per square inch at the shell face produces good results.

FIGURE 4 also illustrates a means for efficiently removing foreign particles from the mold cavities. Table 62′ is designed so the platens swing the shell halves to an intermediate position when in the location shown for booking fixture 66′. A Y-shaped nozzle 124, which is connected to a compressed air line, is suspended above the tilted faces of the shell halves and compressed air from the nozzle is directed at the mold cavities. Since the mold halves are at an angle, the blast of compressed air rapidly and efficiently removes all foreign particles from the mold cavities. The table then rotates the booking fixture into the position of fixture 68′ where the associated motor completes the swinging movement of the platens to bring the mold faces into contact with each other.

Thus this invention provides a process for assembling shell molds rapidly and efficiently. The booking operation by itself considerably reduces the scrap rate of shell molded components while permitting an increase in production rates. Combining and coordinating the operations of the rotary pattern, stacking unit and booking fixture as described automates and streamlines shell mold manufacturing operations to the point where shell molding a wide variety of parts is vastly more economical than conventional molding and casting techniques.

What is claimed is:

1. A process for assembling a shell mold comprising locating one of the portions making up the shell mold on one platen of a booking fixture, locating another portion on the opposite platen of the booking fixture, swinging one platen toward the other platen to bring the faces of the portions into contact with each other at an angle approximately 15° from the vertical, one of said platens swinging beyond the vertical to bring the faces into contact at this angle, said last mentioned platen swinging at a rate that maintains the shell portion in contact with the platen until the faces contact each other, transferring the support of one of said portions from its initial platen via the other portion to the other platen, and swinging the platens away from each other.

2. The process of claim 1 comprising forming a plurality of projections on the exterior surface of each shell mold portion, and shaping the ends of said projections so the locus of the ends thereof conforms to the contour of the surface of said platens.

3. The process of claim 2 comprising mounting said platens on a rotating table, loading the shell portions on the platens when the table rotates the platens into a first radial position, swinging the platens toward each other to bring the faces of the portions into contact when the table rotates into a second position, and swinging the platens away from each other and removing the assembled shell mold from the table when the table rotates into a third position.

4. The process of claim 3 comprising blowing foreign particles from the mold cavities of the shell portions when the table has rotated the platens to a radial position intermediate the first and second radial positions where the platens position the shell portions at an angle relative to a horizontal plane.

5. The process of claim 4 comprising applying an adhesive to the faces of the shell portions after the shell portions are loaded onto the rotating table.

6. The process of claim 5 comprising forming the face edges of the shell portions with an outwardly directed angle, forming aligning pads having a corresponding angle at the inner edges of said platens, and contacting the face edges of the shell portions with the angled surface of the aligning pads during the swinging movement of the platens so the aligning pads assist in holding the shell portions in contact with the appropriate platen until the faces of the shell portions contact each other.

7. The process of claim 1 comprising locating the shell portions on the platens by contacting the face edges of the shell portions with aligning pads attached to the platens.

8. The process of claim 7 in which the face edges have an outwardly directed angle and the surfaces of the aligning pads contacting the face edges have a corresponding angle so the aligning pads assist in holding the shell portions in contact with the appropriate platen until the faces of the shell portions contact each other.

9. A process for making a shell mold comprising contacting a heated pattern with a heat curable mold material, said heated pattern forming a plurality of projecting elements on the exterior surface of the shell portion, spanking the ends of said projecting elements to form the locus of the ends into a predetermined shape conforming to the contour of a booking fixture platen, curing the shell portion, positioning the shell portion on one platen of said booking fixture and positioning a corresponding shell portion on the other platen of said booking fixture with the ends of the projecting elements supporting the shell portions on the respective platen of the booking fixture, and swinging at least one platen of the booking fixture to bring the faces of the shell portions into contact with each other.

10. The process of claim 9 comprising ejecting the cured shell portions from the pattern onto a conveying means, and transporting the shell portions to the booking fixture with said conveying means.

11. The process of claim 10 in which a plurality of heated patterns are producing a plurality of shell portions comprising successively ejecting the shell portions from the patterns on a conveying means, storing the initial shell portion from each pattern in a storage means, moving the initial shell portion and a subsequent shell portion from the same pattern onto the platens of said booking fixture, and bringing the faces of the shell portions into contact with each other on the booking fixture.

12. The process of claim 11 in which the cured shell portions drop onto the conveying means after ejection from the pattern and are supported on the conveying means by the projecting elements.

References Cited

UNITED STATES PATENTS

| | | | |
|---|---|---|---|
| 1,506,047 | 8/1924 | Bryan et al. | |
| 2,796,033 | 6/1957 | Feinstein | 29—463 |
| 2,806,262 | 9/1957 | Davis | 164—166 X |
| 2,807,845 | 10/1957 | Sawyer | 164—37 |

FOREIGN PATENTS 876,429  8/1961  Great Britain.

ROBERT D. BALDWIN, Primary Examiner

U.S. Cl. X.R.

29—208, 463; 164—15, 137, 166